(12) United States Patent
Corral

(10) Patent No.: US 9,049,812 B1
(45) Date of Patent: Jun. 9, 2015

(54) SYSTEM AND METHOD FOR REMOVING VEGETATION FROM SOIL

(71) Applicant: EDC Distributing, LLC, Phoenix, AZ (US)

(72) Inventor: Edward Corral, Phoenix, AZ (US)

(73) Assignee: EDC DISTRIBUTING, LLC, Phoenix, AZ (US)

( * ) Notice: Subject to any disclaimer, the term of this patent is extended or adjusted under 35 U.S.C. 154(b) by 120 days.

(21) Appl. No.: 13/866,363

(22) Filed: Apr. 19, 2013

(51) Int. Cl.
*A01B 1/16* (2006.01)

(52) U.S. Cl.
CPC ....................... *A01B 1/16* (2013.01)

(58) Field of Classification Search
CPC .................... A01B 1/00; A01B 1/16
USPC ........ 172/371, 375–378; 7/114; 269/3, 6, 254
See application file for complete search history.

(56) References Cited

U.S. PATENT DOCUMENTS

| | | | | |
|---|---|---|---|---|
| 481,841 A * | 8/1892 | Bourgin | ........................... | 460/61 |
| 692,585 A * | 2/1902 | Adams | ........................... | 172/49 |
| 1,140,341 A * | 5/1915 | Johnston et al. | ................. | 416/75 |
| 1,924,002 A * | 8/1933 | Rush | ........................... | 294/50.6 |
| 2,066,598 A * | 1/1937 | Wiessner | ........................ | 81/8.1 |
| 2,398,385 A * | 4/1946 | Mintken | ........................ | 172/39 |
| 2,577,333 A * | 12/1951 | Klum | ........................... | 211/70.2 |
| 2,670,938 A * | 3/1954 | Wittmann | ..................... | 366/343 |
| 2,689,762 A * | 9/1954 | Krumm | ........................ | 294/50.6 |
| 2,747,490 A * | 5/1956 | Brown | ........................... | 172/532 |
| 2,860,001 A * | 11/1958 | Garland | ........................ | 294/50.6 |
| 2,912,055 A * | 11/1959 | Buddingh et al. | ............. | 172/526 |
| 3,082,829 A * | 3/1963 | Buddingh et al. | ............. | 172/184 |
| 3,129,771 A * | 4/1964 | Lidstone | ......................... | 172/25 |
| 3,596,966 A | 8/1971 | Shredl | | |
| 4,319,642 A | 3/1982 | Merz | | |
| 4,466,490 A * | 8/1984 | Eckels | ............................ | 171/50 |
| 4,641,712 A * | 2/1987 | Cravotta | ......................... | 172/25 |
| 4,819,736 A | 4/1989 | Hedgepeth | | |
| 5,060,997 A * | 10/1991 | Plecki | ........................... | 294/50.6 |
| 5,261,496 A | 11/1993 | Smotherman | | |
| 5,441,118 A | 8/1995 | Cruz, Jr. | | |
| 5,725,305 A * | 3/1998 | Delbor | ........................... | 366/129 |
| 6,050,344 A | 4/2000 | Larson et al. | | |
| 6,105,681 A * | 8/2000 | Williams | ........................ | 172/378 |
| 6,360,826 B1 * | 3/2002 | Barber | ........................... | 172/371 |
| 6,558,035 B2 * | 5/2003 | Lane | ............................ | 366/129 |
| 6,595,298 B1 * | 7/2003 | Crady | ............................ | 172/41 |
| 6,722,444 B2 | 4/2004 | McKill | | |
| D489,583 S * | 5/2004 | Cheung | ......................... | D7/690 |
| D490,667 S * | 6/2004 | Cheung | ......................... | D7/690 |
| 6,843,324 B2 | 1/2005 | Basek | | |
| 8,051,918 B2 * | 11/2011 | Zeyger | ............................ | 172/37 |
| 8,479,837 B2 * | 7/2013 | Kirchmann | .................... | 172/378 |
| 2003/0177914 A1 * | 9/2003 | Schub | ............................ | 99/348 |
| 2006/0124326 A1 * | 6/2006 | Gilley | ........................... | 172/378 |
| 2008/0172801 A1 * | 7/2008 | Biag | ................................ | 7/114 |
| 2013/0139850 A1 * | 6/2013 | Axelsson et al. | ................. | 134/6 |
| 2014/0014378 A1 * | 1/2014 | Sedmak | ......................... | 172/15 |

* cited by examiner

*Primary Examiner* — Robert Pezzuto
*Assistant Examiner* — Jessica H Lutz
(74) *Attorney, Agent, or Firm* — Lisa Foundation Patent Law Clinic at Arizona State University

(57) ABSTRACT

A vegetation removal device including a shaft that has a helix attached to the shaft's first curved end. When the helix is placed within proximity of unwanted vegetation and rotated radially, the helix will entangle the vegetation and remove it from the soil. In one embodiment, the shaft comprises a second end that is configured to be attached to an electronic device, which allows users to easily rotate the shaft and helix.

18 Claims, 2 Drawing Sheets

SYSTEM AND METHOD FOR REMOVING VEGETATION FROM SOIL

BACKGROUND OF THE INVENTION

1. Field of the Invention

The present invention relates to landscaping tools and more particularly relates to a system and method for removing vegetation from soil.

2. Description of Related Art

Efficiently removing unwanted vegetation while minimally disturbing the surrounding area is a goal of any landscaper or landowner. The traditional method of weed removal—using one's hands—is an inefficient practice and often necessitates disturbing the soil where the vegetation lives. As such, various weed removal apparatuses have been developed to streamline this process.

So as to reduce the complexity and length of the Detailed Specification, and to fully establish the state of the art in certain areas of technology, Applicant herein expressly incorporates by reference all of the following materials identified in each numbered paragraph below.

One example of a weed removal apparatus that seeks to minimally disturb the surrounding area is U.S. Pat. No. 3,596,966 to Shredl which discloses a weeder that utilizes rotating prongs to entangle weeds and break up the ground in which they live.

Similarly, U.S. Pat. No. 4,819,736 to Hedgepeth discloses a weeder with a "three-tined head" that operates by inserting the middle prong into the ground and then rotating the weeder so that the sharp outer prongs loosen the soil.

U.S. Pat. No. 5,441,118 to Cruz, Jr. discloses a weeder with "coil-shaped tines" that have sharp ends, which allows the tines to be inserted into the ground and then rotated to loosen the soil.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

This summary is provided to introduce a selection of concepts in a simplified form that are further described below in the detailed description. This summary is not intended to identify key or essential features of the claimed subject matter, nor is it intended to be used as an aid in determining the scope of the claims.

Provided is a system and method for removing vegetation from soil comprising a shaft comprising a first curved end, a helix coupled to the first curved end of the shaft such that the first curved end of the shaft runs substantially axially through the helix, the helix comprising a first curved end and a second curved end, and the shaft being configured to rotate radially to remove vegetation from soil by entangling the vegetation within the helix.

Particular aspects may comprise one or more of the following features. The shaft may further comprise a second end comprising a cross-member that is substantially perpendicular to the shaft. A length of the shaft may be within a range of one to eight feet. A diameter of the shaft may fall within a range of one to six centimeters. The apparatus may further comprise a guard that runs substantially parallel to the shaft and is coupled to the first curved end of the shaft. The length of the guard may be within a range of half an inch to four inches. The diameter of the helix may be about two times the diameter of the shaft. The helix may comprise a plurality of coils that is within a range of four to twelve coils. At least a portion of the coils among the plurality of coils may be located within a range of half a centimeter to two centimeters of spacing between adjacent coils. The first curved end and second curved end of the helix may be substantially arced.

Also provided is a system and method for removing vegetation from soil comprising a shaft comprising a first curved end and second end configured to couple to an electronic device that is configured to rotate the shaft, a helix coupled to the first curved end of the shaft such that the first curved end of the shaft runs substantially axially through the helix, the helix comprising a first curved end and second curved end, and the shaft being configured to rotate radially to remove vegetation from soil by entangling the vegetation within the helix.

Particular aspects may comprise one or more of the following features. The electronic device may be a power drill. The second end of the shaft may comprise a cross-member that is substantially perpendicular to the shaft. The cross-member may be configured to be inserted into the chuck of an electronic device. The length of the shaft may be within a range of one to eight feet. The apparatus may further comprise a guard that runs substantially parallel to the shaft and is coupled to the first curved end of the shaft. The diameter of the helix may be about two times the diameter of the shaft. The helix may comprise a plurality of coils that is within a range of four to twelve coils. At least a portion of the coils among the plurality of coils may be located within a range of half a centimeter to two centimeters of spacing between adjacent coils. The first curved end of the helix may be substantially arced.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Landscapers, gardeners, and landowners are constantly seeking to efficiently remove unwanted vegetation with minimal disturbance to the soil. Using one's hands to remove vegetation typically involves pulling the vegetation from the soil, which often results in damage to the soil. Furthermore, using one's hands is a time consuming process that puts strain on one's body. Similarly, weed removal apparatuses that involve digging into the soil will result in damage to the soil and the need to smooth over the soil once the vegetation has been removed. Thus, there exists a need for an apparatus that efficiently removes vegetation, does not disturb the soil, and puts minimal stress on the user's body.

Figure 1:
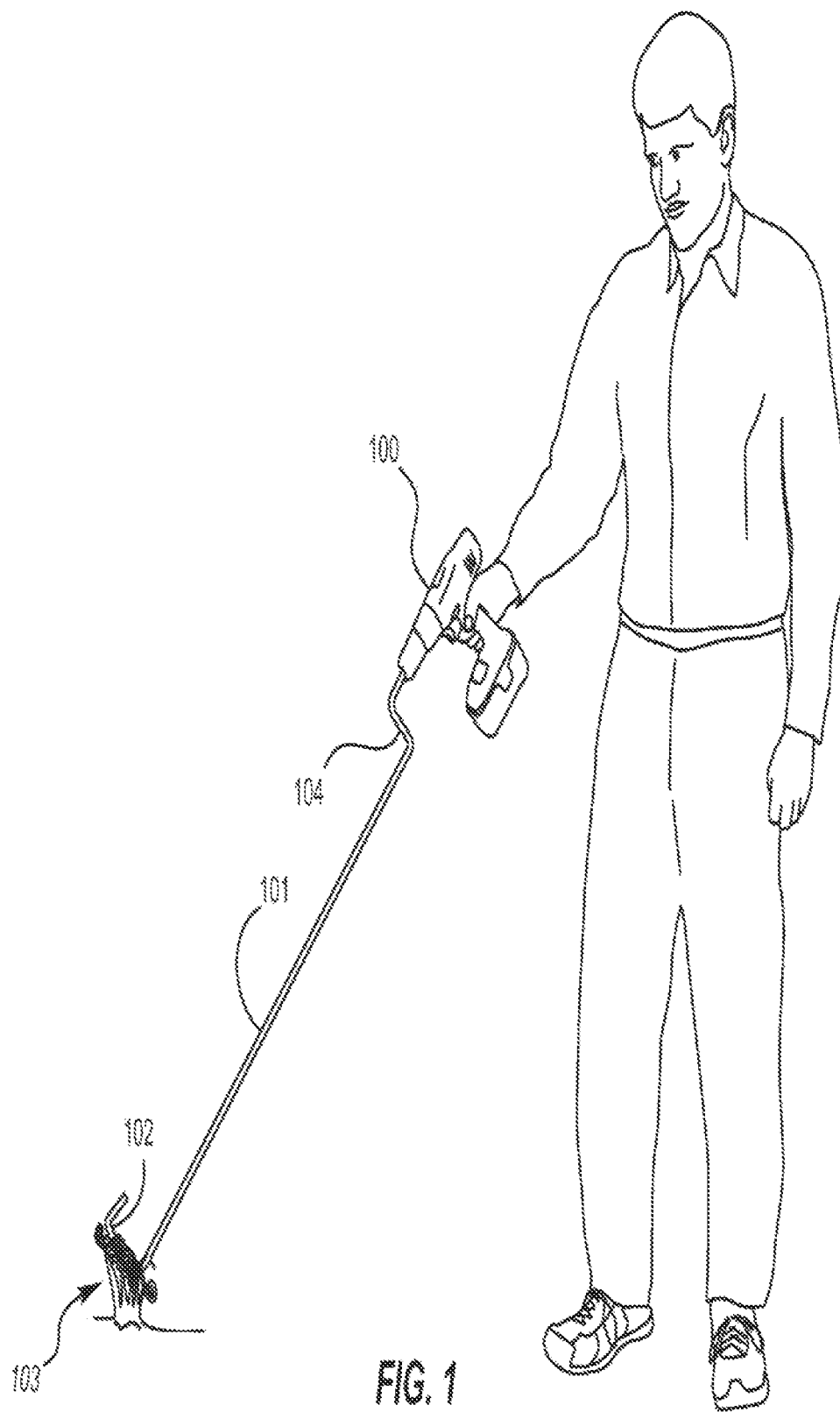
FIG. 1 depicts an implementation of an apparatus for removing vegetation from soil in use.

FIG. 1 depicts a human using an implementation of an apparatus for removing vegetation from soil. In FIG. 1, the apparatus is coupled to a power drill 100. The apparatus may be coupled, however, to any other electric tool that causes the apparatus to rotate radially. The apparatus may also be coupled to a non-electronic tool capable of rotating the apparatus radially, such as non-electronic drill with a crank handle. When the power drill or other device is activated, it rotates the entire apparatus radially, including the shaft 101, first curved end of the shaft 102, and the helix 103. When the first curved end of the shaft 102 and the helix 103 is placed within unwanted vegetation and rotated radially, the helix 103 will entangle the vegetation and remove it from the soil without digging into the soil. This is especially useful when one seeks to quickly remove unwanted vegetation in a pinch. For example, if a homeowner is hosting a backyard party and only has a few minutes before guests arrive, he can quickly remove unwanted vegetation without the need to replace disturbed soil, which is time consuming and messy. Once vegetation is entangled and removed from the soil, the user can bring the first curved end of the shaft 102 and the helix 103 to his free hand, remove the vegetation from the helix 103 using his free hand, and dispose of it. When removing vegetation from the helix, so as not to dirty or damage his hands, the user may use protective gloves, a towel, or any other protective material to prevent the vegetation from coming into contact with his skin. If the user desires, he can pull a cross-member 104 with his free hand to lift the first curved end of the shaft 102 and the helix 103 away from the soil. Throughout this entire process, the user can comfortably remain standing upright and keep the power drill at or around waist level. This is desirable over the traditional alternatives, i.e. crawling around using a hand tool to remove vegetation, bending over awkwardly to remove vegetation with one's hands or a hand tool, etc.

Figure 2:
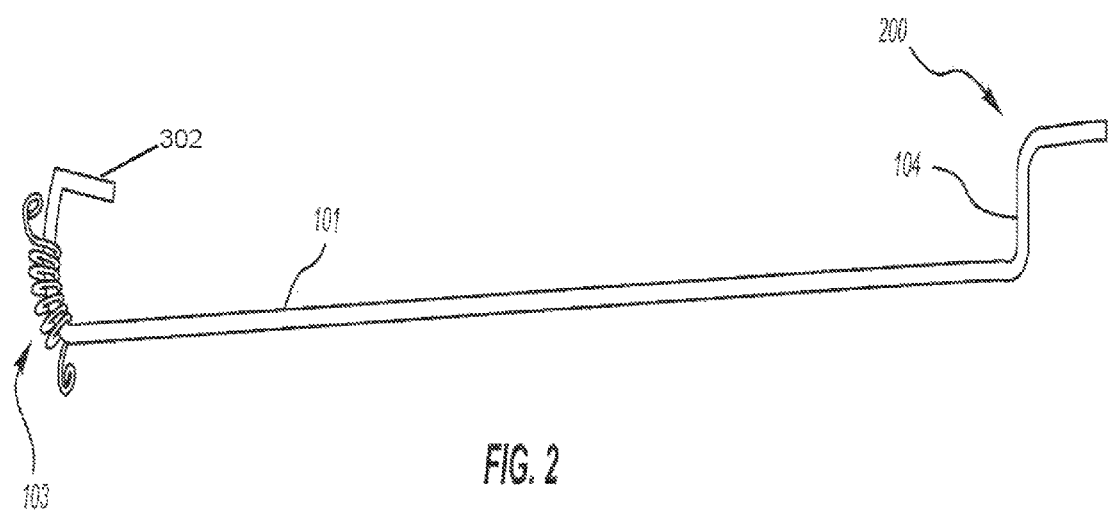
FIG. 2 depicts an implementation of an apparatus for removing vegetation from soil.

FIG. 2 depicts an implementation of an apparatus for removing vegetation from soil. The shaft 101 is typically a length that extends comfortably from one's waist to the ground—about two to four feet. The shaft 101 may be longer or shorter, however, to facilitate varying needs, such as a longer shaft 101 to access a hard to reach area. The diameter of the shaft 101 will typically fall within a range of one to six centimeters, though it is not limited to this range. The shaft 101 can be made of any hard composite, such as steel, metal, aluminum, plastic, etc. In one embodiment, the second end of the shaft 200 further comprises a cross-member 104 which is substantially perpendicular to the shaft 101. A cross-member 104 can be used to aid the user in lifting the shaft 101 away from the vegetation when he wants to remove the vegetation from the helix 103. A cross-member 104 can also be configured to be coupled to an electronic device 100. In this embodiment, the cross-member 104 will typically be coupled to the chuck of an electronic device 100. The electronic device 100 can be any device configured to rotate the shaft radially, such as a power drill. The device used to rotate the shaft 101 radially is not limited, however, to electronic devices 100. The shaft 101 can also be rotated using one's hands or any non-electronic device capable of rotating the shaft, such as a non-electronic drill with a crank handle.

Figure 3:
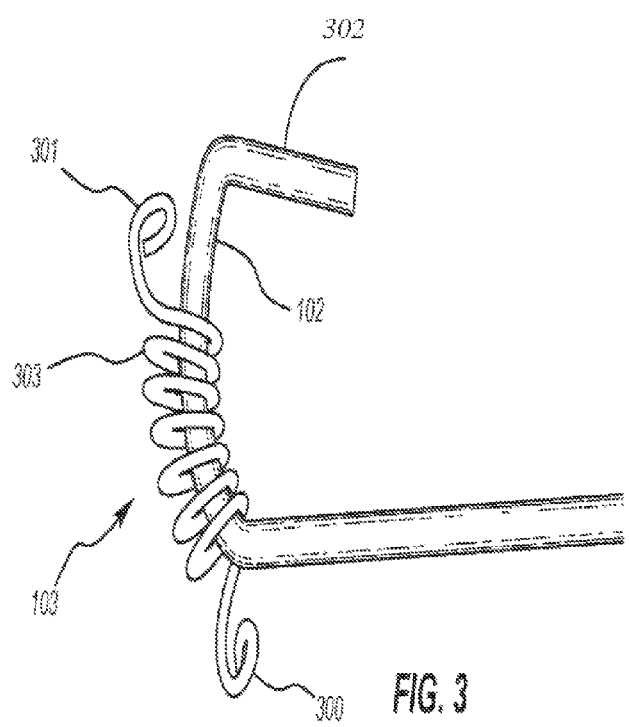
FIG. 3 depicts a detailed view of an operative portion of an implementation of an apparatus for removing vegetation from soil.

FIG. 3 depicts a detailed view of the first curved end of the shaft 102, the helix 103, the first curved end of the helix 300, the second curved end of the helix 301, and the guard 302. The first curved end of the shaft 102 runs substantially axially through the helix 103. The diameter of the helix 103 is large enough that the helix 103 can wrap around the first curved end of the shaft 102 leaving a space between the helix 103 and the first curved end of the shaft 102. Thus, the diameter of the helix 103 is about two times the diameter of the shaft 101, though it is not limited to this diameter. The helix 103 need not be physically connected to the first curved end of the shaft 102. The helix 103 can be loosely wrapped around the first curved end of the shaft 102 such that the helix 103 slides along the first curved end of the shaft 102, increasing the area from which it entangles vegetation. The helix 103 comprises a plurality of coils 303 that may fall within a range of four to twelve coils 303, but the helix 103 may comprise more or less coils 303 depending on size of the unwanted vegetation. At least a portion of the coils 303 among the plurality of coils 303 are located roughly within a range of half a centimeter to two centimeters of spacing between adjacent coils 303, though a larger amount of spacing may be used for larger vegetation. This spacing allows vegetation to become engaged in the helix 103. Once the vegetation is engaged in the helix 103 and the helix 103 is rotated radially, the helix 103 will pull the vegetation from the soil. The helix 103 can be made of any material, such as steel, metal, wire, aluminum, plastic, mesh, etc. The helix 103 comprises a first curved end 300 and a second curved end 301. The first curved end of the helix 300 and the second curved end of the helix 301 serve to further ensnare vegetation. In FIG. 3, the first curved end of the helix 300 and the second curved end of the helix 301 are substantially arced, forming a hook-like shape. In this embodiment, when the helix 103 is rotated radially, vegetation will be corralled by the first curved end of the helix 300 and the second curved end of the helix 301. Once corralled and thus in close proximity to the helix 103, vegetation will become entangled within the coils of the helix 303.

There is no limit to the form that the first curved end of the helix 300 and the second curved end of the helix 301 can take. For example, they may form a rod-like blade capable of cutting through unwanted vegetation. In this embodiment, the apparatus will not only entangle unwanted vegetation, but it will also cut it and the vegetation will subsequently fall to the ground. In another embodiment, the first curved end of the helix 300 and the second curved end of the helix may 301 form helixes that are smaller than the main helix 103. This embodiment would be particularly useful in the removal of extremely thin or fine vegetation.

The guard 302 serves two purposes. First, it serves to keep the helix 103 from sliding off the first curved end of the shaft 102. Second, it prevents the first curved end of the shaft 102 from damaging surrounding infrastructure, such as walls, stones, trees, etc. The guard 302 is substantially parallel to the shaft 101. As such, once the shaft 101 is rotated radially, the guard 302 will smoothly brush against any surrounding infrastructure, reducing the risk of scratching that would occur in the absence of the guard 302. The guard 302 can be an extension of the first curved end of the shaft 102 made out of the same material as the first curved end of the shaft 102. It can also, however, be made of a softer material, such as rubber. The length of the guard 302 typically falls within a range of half an inch to four inches. Other lengths are, however, also possible. For example, in the embodiment where the shaft 101 is elongated to reach hard to reach places, the guard 302 may also be longer.

There may also be embodiments where the guard 302 is not present. For example, the first curved end of the shaft 102 itself may form a helix rather than extending axially through a separate helix 103. In this embodiment, a guard 302 would not be necessary to prevent the helix from sliding off the first curved end of the shaft 102. The helix would then be roughly the same diameter as the shaft 101. In another embodiment, the helix 103 could be connected to the first curved end of the shaft 102 such that the helix 103 does not slide along the first curved end of the shaft 102. For example, one of the coils of the helix 303 could be welded to the first curved end of the shaft 102, keeping it permanently in place. Here, again, a guard 302 would not be necessary to prevent the helix 103 from sliding off the first curved end of the shaft 102.

I claim:

1. An apparatus for removing vegetation from soil, comprising: a shaft comprising a first curved end;
   a helix coupled to the first curved end of the shaft such that the first curved end of the shaft runs substantially axially through the helix, the helix comprising a first curved end, a second curved end, and a plurality of separated coils; and
   a guard that runs substantially parallel to the shaft and is coupled to the first curved end of the shaft,
      wherein the shaft is configured to rotate radially to remove vegetation from soil by entangling the vegetation within the separated coils of the helix.

2. The apparatus of claim 1, wherein the shaft further comprises a second end comprising a cross-member that is substantially perpendicular to the shaft.

3. The apparatus of claim 1, wherein a length of the shaft is within a range of one to eight feet.

4. The apparatus of claim 1, wherein a diameter of the shaft falls within a range of one to six centimeters.

5. The apparatus of claim 1, wherein a length of the guard is within a range of half an inch to four inches.

6. The apparatus of claim 1, wherein a diameter of the helix is about two times a diameter of the shaft.

7. The apparatus of claim 1, wherein the helix comprises a plurality of coils that is within a range of four to twelve coils.

8. The apparatus of claim 7, wherein at least a portion of the coils among the plurality of coils are located within a range of half a centimeter to two centimeters of spacing between adjacent coils.

9. The apparatus of claim 1, wherein the first curved end and second curved end of the helix are substantially arced.

10. An apparatus for removing vegetation from soil, comprising:
    a shaft comprising a first curved end and a second end configured to couple to an electronic device that is configured to rotate the shaft;
    a helix coupled to the first curved end of the shaft such that the first curved end of the shaft runs substantially axially through the helix, the helix comprising a first curved end, a second curved end, and a plurality of separated coils; and
    a guard that runs substantially parallel to the shaft and is coupled to the first curved end of the shaft,
       wherein the shaft is configured to rotate radially to remove vegetation from soil by entangling the vegetation within the separated coils of the helix.

11. The apparatus of claim 10, wherein the electronic device is a power drill.

12. The apparatus of claim 10, wherein the second end of the shaft comprises a cross-member that is substantially perpendicular to the shaft.

13. The apparatus of claim 12, wherein the cross-member is configured to be inserted into the chuck of an electronic device.

14. The apparatus of claim 10, wherein a length of the shaft is within a range of one to eight feet.

15. The apparatus of claim 10, wherein a diameter of the helix is about two times a diameter of the shaft.

16. The apparatus of claim 10, wherein the helix comprises a plurality of coils that is within a range of four to twelve coils.

17. The apparatus of claim 16, wherein at least a portion of the coils among the plurality of coils are located within a range of half a centimeter to two centimeters of spacing between adjacent coils.

18. The apparatus of claim 10, wherein the first curved end and the second curved end of the helix are substantially arced.

\* \* \* \* \*